Jan. 15, 1935.  C. O. DUEVEL, JR., ET AL  1,987,892
DOUBLE WALLED VACUUM CONTAINER
Filed Sept. 20, 1932
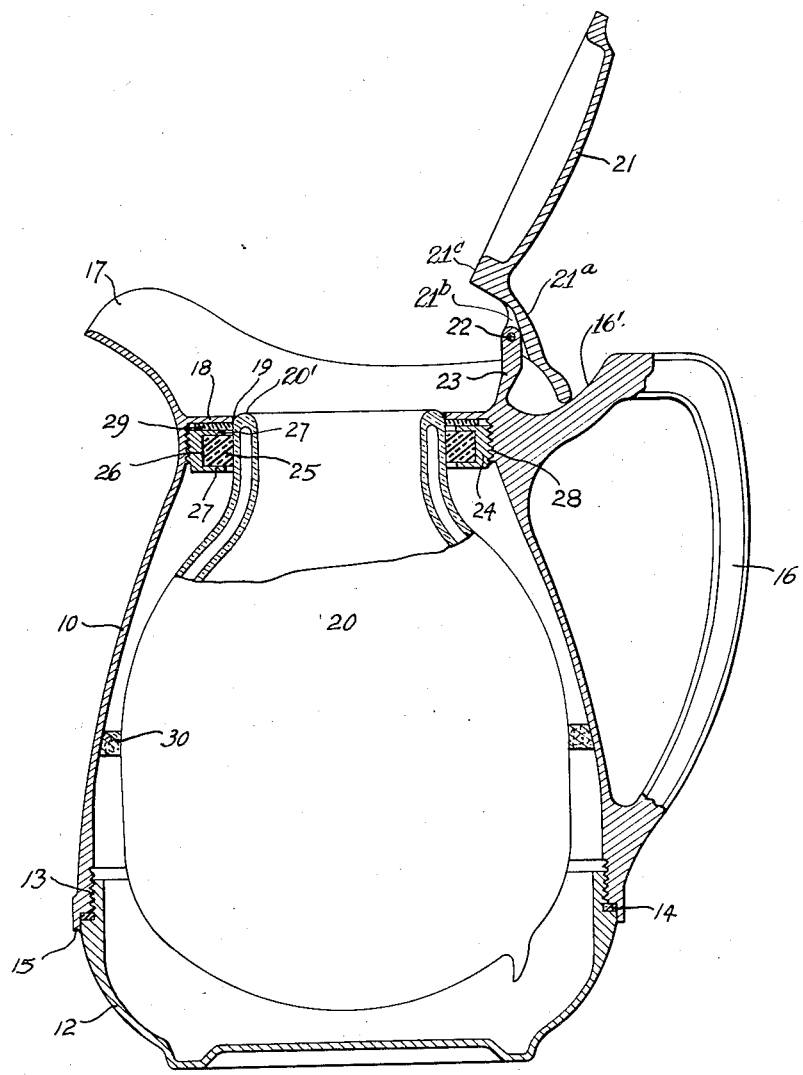
Charles O. Duevel, Jr.
Arthur H. Payson
INVENTORS
BY Adolph A. Thomas
ATTORNEY Patented Jan. 15, 1935

1,987,892

UNITED STATES PATENT OFFICE 1,987,892

DOUBLE-WALLED VACUUM CONTAINER

Charles O. Duevel, Jr., and Arthur H. Payson, Norwich, Conn., assignors to The American Thermos Bottle Company, Norwich, Conn., a corporation of Ohio Application September 20, 1932, Serial No. 633,940

3 Claims. (Cl. 215—13)

Our invention relates to heat-insulated receptacles of the double-walled vacuum type, and its object is to provide a container embodying various novel features whereby the construction is improved and the cost of manufacture decreased.

It is generally known that vacuum-insulated containers comprise an outer casing (usually of metal) and an inner double-walled filler of glass which forms the container proper. As the walls of these fillers are comparatively thin and fragile, great care has always been necessary to support the filler as shock-proof as possible. The usual method of mounting these fillers in prior containers has been to provide a bottom support for the filler, such as a spring, cork seat, and the like. These bottom supports were objectionable for several reasons: they increased the cost of the container, their shock-absorbing function frequently failed, and they had to be removed and replaced for the insertion of a new filler.

In our new vacuum container we support the filler at the neck by providing it with a screw-threaded ring connected directly to the casing. This ring is securely mounted on the filler by means of a rubber gasket which is compressed against the wall of the filler and is thereby held in tight frictional engagement. This supporting unit is a permanent attachment with which the fillers are provided when sold as refills. A rubber ring placed above the screwthreaded supporting ring is compressed to form a liquid-tight joint around the rim of the filler. A second rubber ring engaging the body of the filler lower down protects it against lateral shocks. The outer casing is preferably die-cast in two sections,—a main upper section which may have an integral handle, and a short bottom section screwed to the main section. When the bottom section is unscrewed, the lower end of the filler is exposed for easy grasping by the fingers.

The novel features and practical advantages of our invention will be clearly understood from a description of the accompanying drawing, which represents a vertical cross-section through a pot or jug embodying our invention. The outer casing consists of a main upper section 10 and a short bottom section 12, these sections being provided with engaging screwthreads 13 for separably connecting them. A gasket 14 of rubber or the like may be interposed to insure a liquid-tight joint, which is concealed by a projecting lip 15 on the upper section 10. The parts 10 and 12 are preferably die-cast, including the screwthreads 13, this method of manufacture being extremely cheap. In the case of a coffee pot, as shown in the drawing by way of example, the upper section 10 of the casing is formed with a handle 16, a spout 17, and an inwardly projecting lip 18, which defines an opening 19 for the top rim of the double-walled glass filler 20. A lid 21 is pivoted on a pin 22 carried by the extension 23. The parts 16, 17, 18 and 23 are preferably integral with section 10.

As shown in the drawing, the lid or cover 21 is preferably a single piece, die cast or molded, and the pivot pin 22 passes through the integral extension 21a of the cover. For this purpose, the extension 21a is formed with a recessed portion to provide one or more lugs 21b through which the pin 22 passes. The circular flat under-edge 21c of the cover rests on the lip 18 when the cover is closed. The outer end of extension 21a serves as a finger piece for manipulating the cover, and the handle 16 is recessed or curved at 16' to accommodate the cover extension when the cover is thrown open. The pivot axis 22 of the cover extends substantially at right angles to the plane of handle 16.

The glass filler 20 carries at its neck a supporting unit which comprises a ring 24 and a rubber gasket 25 mounted in the recess 26 of the ring. A practical way of mounting the unit 24—25 on the filler is to press the sides 27 of ring 24 together, whereby the gasket swells out and is forced against the wall of the filler in tight frictional engagement. We have found that this holds the supporting unit 24—25 safely on the neck of the filler as a permanent part thereof. The ring 24 has screwthreads adapted to engage screwthreads in the adjacent inner wall of casing section 10. These interengaging screwthreads are shown at 28. A flat rubber gasket 29 or the like is placed between the lip 18 and ring 24, and when the latter is screwed home, the gasket is compressed to form a liquid-tight joint or seal around the top rim of filler 20. The lip 18 almost or barely touches the filler, so that the gasket 29 is hidden. A rubber ring 30 is placed around the body of the filler lower down to take up side shocks, which are also absorbed at the upper end of the filler by the rubber gasket 25.

It will be understood from the foregoing description that we have produced a double-walled vacuum container of greatly simplified construction, cheapness of manufacture, and durability in handling. The fragile filler 20 is so supported that it will not break even when the container is handled with less than ordinary care. All the joints are leak-proof, so that no liquid can get into the space between the filler and casing, either when pouring out the contents or when the pot is washed. To insert a new filler, it is only necessary to take off the bottom section 12, unscrew the old filler, and screw into place a new one. As previously stated, these refills come with the screw ring 24 attached, so that the insertion of a new filler is an exceedingly simple matter. When the filler is being screwed in, there is no danger of its breaking by being screwed in too far, for the reason that the frictional engagement between the filler and the rubber gasket 25 permits rotary movement of the filler within the gasket in the event that the operator should continue to turn the filler after the screw-ring 24 has reached the limit of its inward movement. The leak-proof joint between the casing and the inserted filler is always assured by the fact that the top rim 20' of the filler projects through the opening 19 formed by lip 18. This arrangement automatically takes care of any variations in the length of the filler and any unevenness in the top rim 20', so that these irregularities in the filler structure (and they occur unavoidably) do not prevent a liquid-tight seal in every instance around the opening 19. This feature we have found to be of considerable practical advantage.

Although we have shown and described a specific form of our invention, we want it understood that we are not limited to the details set forth, for various changes and modifications are possible within the scope of the appended claims.

We claim as our invention:

1. A double-walled vacuum container comprising an outer casing provided with screwthreads near the top thereof, a double-walled filler in said casing, a separate rigid ring attached to said filler and provided with elastic compressible means engaging said filler to secure said ring to the filler, said ring being held spaced from the filler by said compressible elastic means which absorbs lateral shocks, integral means on said ring for holding said elastic means pressed radially inward against the wall of said filler, whereby the latter is firmly suspended at the neck, screwthreads on said ring arranged to engage the screwthreads in said casing, whereby the filler is removably attached to the casing, an annular lip on said casing above said ring, said lip defining a circular opening through which the top of said filler projects, and a compressible gasket between said lip and said screwthreaded ring to form a liquid-tight joint between the top rim of the filler and the adjacent edge of said lip.

2. A double-walled vacuum container comprising an outer casing provided with interior screwthreads, said casing having an opening above said screwthreads, a double-walled filler in said casing, the top rim of said filler projecting through said opening, a supporting unit removably secured to the upper end of said filler, said supporting unit consisting of a screwthreaded ring which carries a rubber gasket arranged to engage the filler in a tight frictional fit, said rubber gasket holding said ring spaced from the filler and being adapted to absorb lateral shocks, the screwthreads on said ring engaging the screwthreads on said casing, and a compressible washer engaged by said ring and forced against said filler when the ring is screwed in to form a liquid-tight seal around said opening, said washer being arranged below the top edge of the filler.

3. A double-walled vacuum container comprising an outer casing provided at the top with an annular lip projecting inwardly and defining a circular opening, screwthreads in said casing below said lip, a double-walled filler in said casing, the top rim of said filler projecting through said opening, a rigid ring mounted on said filler, elastic means for frictionally attaching said ring to said filler, said elastic means holding said ring spaced from the filler and being adapted to absorb lateral shocks, screwthreads on said ring arranged to engage the screwthreads of said casing, whereby the filler is removably connected to the casing, and a flexible gasket arranged between said ring and the underside of said lip to form a liquid-tight joint between said lip, and a circular contact line on said filler below the top edge thereof, said gasket being held compressed by said engaging screwthreads.

CHARLES O. DUEVEL, Jr.,
ARTHUR H. PAYSON.